(12) United States Patent
Koufogiannakis et al.

(10) Patent No.: US 9,880,864 B2
(45) Date of Patent: Jan. 30, 2018

(54) DYNAMIC CONFIGURATION SYSTEM FOR DISTRIBUTED SERVICES

(71) Applicant: Microsoft Technology Licensing, LLC, Redmond, WA (US)

(72) Inventors: Christos Koufogiannakis, Menlo Park, CA (US); Jianchao Lu, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/943,805

(22) Filed: Nov. 17, 2015

(65) Prior Publication Data
US 2017/0139725 A1    May 18, 2017

(51) Int. Cl.
| | | |
|---|---|---|
| *G06F 9/445* | (2006.01) | |
| *G06F 9/44* | (2006.01) | |
| *G06F 17/30* | (2006.01) | |
| *G06Q 50/16* | (2012.01) | |
| *G06F 9/54* | (2006.01) | |

(52) U.S. Cl.
CPC ............ *G06F 9/44505* (2013.01); *G06F 8/67* (2013.01); *G06F 8/71* (2013.01); *G06F 17/30477* (2013.01); *G06F 9/542* (2013.01); *G06Q 50/163* (2013.01)

(58) Field of Classification Search
CPC ...... G06F 9/542; G06F 17/30477; G06F 8/67; G06F 8/71; G06F 9/44505; G06Q 50/163
See application file for complete search history.

(56) References Cited

U.S. PATENT DOCUMENTS

| | | | |
|---|---|---|---|
| 5,832,505 A | 11/1998 | Kasso et al. | |
| 6,237,092 B1 | 5/2001 | Hayes, Jr. | |
| 8,468,513 B2 | 6/2013 | Zorn | |
| 2005/0027549 A1* | 2/2005 | Chen | G06F 9/542 |
| | | | 705/314 |
| 2005/0120160 A1* | 6/2005 | Plouffe | G06F 9/45537 |
| | | | 711/1 |
| 2008/0250419 A1* | 10/2008 | Kasten | H04L 67/14 |
| | | | 718/104 |

OTHER PUBLICATIONS

"International Application Serial No. PCT/US2016/057696, International Search Report dated Feb. 2, 2017", 4 pgs.
"International Application Serial No. PCT/US2016/057696, Written Opinion dated Feb. 2, 2017", 7 pgs.

* cited by examiner

*Primary Examiner* — Terrell Johnson
(74) *Attorney, Agent, or Firm* — Schwegman Lundberg & Woessner, P.A.

(57) ABSTRACT

A system includes a dynamic configuration property database for a computer-based service. The system executes an application program interface that couples the computer-based service to the database. The system reads a dynamic configuration property from the database while the computer-based service is executing and without requiring the computer-based service to cease execution. The system also provides the dynamic configuration property to the computer-based service while the computer-based service is executing such that the computer-based service can use the configuration property without requiring the computer-based service to cease execution and without having to restart the computer-based service.

17 Claims, 5 Drawing Sheets

| SERVICE NAME ⎯410 | PROPERTY NAME ⎯420 | DOCUMENT ⎯430 |
|---|---|---|
| service1 | throttle_factor | Default Value: 0.0 ⎯431<br>Type: Double ⎯432<br>DataCenter: {Texas: 1.0, Virginia: 0.5} ⎯433<br>Host: {} ⎯434<br>Timestamp: 11/9/2015 7:50:33 GMT ⎯435 |
| service1 | enable_dual_writes | Default Value: false<br>Type: Boolean<br>DataCenter: {Texas: true}<br>Host: {Iva1-app5585: true}<br>Timestamp: 11/10/2015 8:45:23 GMT |
| service2 | throttle_factor | Default Value: 0.0<br>Type: Double<br>DataCenter: {}<br>Host: {}<br>Timestamp: 11/11/2015 9:14:15 GMT |

*FIG. 4*

| SERVICE NAME / 510 | PROPERTY NAME / 520 | VERSION / 530 | DOCUMENT / 540 |
|---|---|---|---|
| service1 | throttle_factor | v1 | 541 — Change Type: Insert<br>542 — Timestamp: 09/15/2015 3:15:33pm GMT<br>543 — Author: user1<br>544 — Default_Value: 0.0<br>545 — DataCenter: {Texas: 1.0}<br>546 — Host: {} |
| service1 | enable_dual_writes | v2 | Change Type: Insert<br>Timestamp: 09/16/2015 2:10:00pm GMT<br>Author: user1<br>Default_Value: false<br>DataCenter: {}<br>Host: {} |
| service1 | throttle_factor | v3 | Change Type: Update<br>Timestamp: 10/05/2015 9:55:20am GMT<br>Author: user2<br>Default_Value: 0.0<br>DataCenter: {Texas: 1.0, Virginia: 0.5}<br>Host: {} |

*FIG. 5* ns. Furthermore, the test system may not be able to define different values for different data centers and/or different hosts, and a test system may not always be available and up and running.

Consequently, a new method is needed to handle a configuration property system, and in particular, dynamic configuration properties.

DYNAMIC CONFIGURATION SYSTEM FOR DISTRIBUTED SERVICES

TECHNICAL FIELD

The subject matter disclosed herein generally relates to a computer system, and in an embodiment, a dynamic configuration system for distributed services.

BACKGROUND

In a configuration system, a user can define and store in a configuration database configuration properties (e.g., key value pairs) that a service can read and then use to alter its behavior. In a typical configuration system, the records of a configuration database include the name or identify of the service, the property name, an environment or host identifier, and a value for the configuration property. The value can be a default value, a value for a data center, a value for a particular host, or a value for all hosts. For example, a service that posts job openings can have a name of Job-Searcher and can include a configuration property for that particular service such as the maximum number of queries that it can handle during a particular time period. That configuration property can also include, for example, a default value of 300 maximum queries, and can have maximum queries of 250 and 350 for a first data center and a second data center respectively. Such a record in the configuration database could resemble the following:
(JobSearcher, MaxQPS, default:300, DataCenterOne: 250, DataCenterTwo:350)

Configuration systems normally include static configuration properties and dynamic configuration properties. Static configuration properties are only needed at the time of system start up, so they need not be supplied during the execution of a service. However, if a static parameter does have to change, it requires a code commit, the building and deployment of a new configuration, and the restarting of the service to implement the new configuration. Examples of typical static configuration properties include the maximum amount of processing memory, a database's internet protocol (IP) address, and the version of Java being used by the service. Other configuration properties can be dynamic in nature, that is, they are amenable to change while the service is running. However, to implement the change of the dynamic configuration property, the system must be restarted. Examples of typical dynamic properties include the maximum queries per second permitted by a service, a throttle factor, and an identification of a black/white list.

There are inherent problems associated with the static nature of a configuration system, and in particular, changing the value of a dynamic property in a static configuration system. First, typically only software engineers can make changes to configuration properties. Second, it can take hours to roll out a new configuration property for a service. Such a limitation is quite unacceptable for a typical online service. Third, restarting a service has side effects such as downtime, the loss of in-memory caches, and the monitoring of metric spikes and dips.

In some systems, developers overcome and/or work around the static nature of a configuration system by using a test or experimental system to pass configuration properties to a commercial or production system. However, this is really a misuse of the test system and it comes with its own problems and issues. For example, a test system may not be able to support all types of values such as integer, double, Boolean, and lists of integers, doubles, strings, and/or Bool-

BRIEF DESCRIPTION OF THE DRAWINGS

Some embodiments are illustrated by way of example and not limitation in the figures of the accompanying drawings.

FIG. 4 illustrates an example of a configuration property table.

FIG. 5 illustrates an example of a configuration property change history table.

DETAILED DESCRIPTION

Example methods and systems are directed to a dynamic configuration system for distributed online services. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One or more embodiments relate to a novel dynamic configuration system. The dynamic configuration system provides an application program interface (API) that a service can use to read configuration properties defined for that service. After reading the properties, the API returns to the service one or more values that are associated with the one or more properties. The new dynamic configuration system includes several features and capabilities. The dynamic configuration system permits changes that are made to configuration properties to be available to online services in near real-time without having to restart the online services. This results in an improvement to the operation of the computer system upon which the online service executes and to the operation of the online service itself. The dynamic configuration system allows the changes to be made using a graphical user interface (GUI). Moreover, the changes do not require a code commit, so the changes need not be made by a developer or an engineer. The dynamic configuration system permits changes to the configuration properties to be strongly typed, that is, all programming types such as integer, long, double, float, Boolean (plus lists of these basic types) are supported. The dynamic configuration system includes default values for each property, and values for a specific host and/or data center. As noted, the configuration system provides an application program interface (API) to online services that enable the online services to read the configuration file that contains the configuration properties. The API is user friendly and does not require any knowledge of how the underlying configuration system works. It is worth noting that embodiments of the dynamic configuration system need not replace static configuration systems or subsystems, since as pointed out above, some configuration properties are static by nature, and for such configuration properties there is simply not a need for dynamism.

At a high level, embodiments of the dynamic configuration system include three main components. First, a GUI permits users to create, update, and delete configuration properties. Second, a permanent storage database stores all configuration properties and a history of changes. Third, a client library provides an API that online services can use to read configuration properties.

Figure 1:
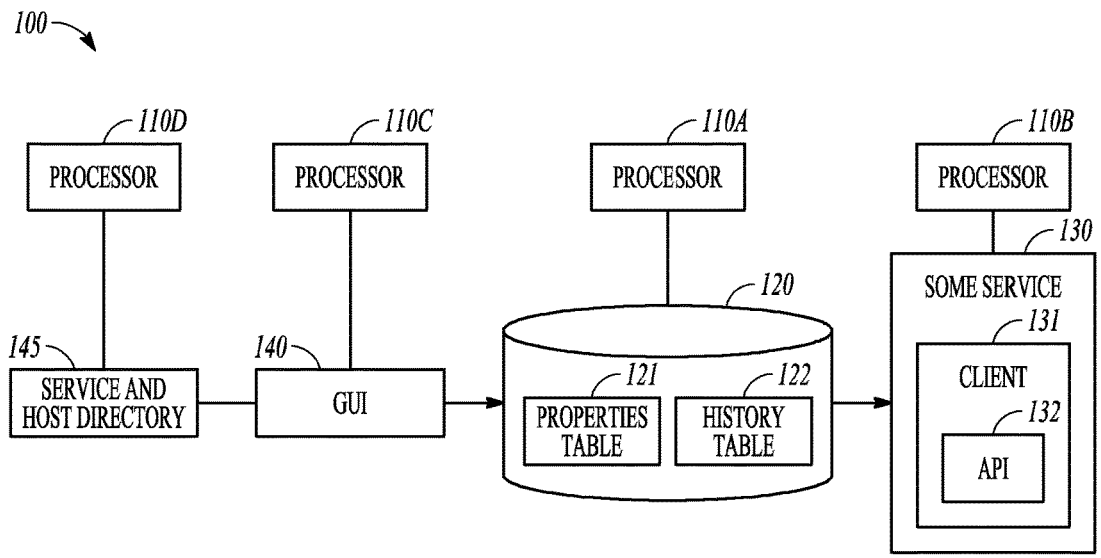
FIG. 1 is a block diagram of an example configuration property system.

More specifically, FIG. 1 is a block diagram of an example configuration property system 100. The system 100 includes computer processors 110A, 110B, 110C, and 110D, which are respectively coupled to a configuration database 120, a service 130, a graphical user interface (GUI) 140, and a service and host directory 145. The service 130 can be any online service such as a professional networking site, a site to post, search for, and apply for jobs, etc. Each service 130 has access to a client 131 and an application program interface (API) 132 that are in communication with the configuration database 120. The configuration database 120 includes a properties table 121 and a history table 122. The properties table 121 includes data such as the name or identify of the service, the configuration property name, an environment or host identifier, and a value for the configuration property. The history table 122 includes a history of all the changes that have been made to all of the configuration properties for a service. The GUI 140 permits a user to change the values of a configuration property (and this change is recorded in the history table 122). The service and host directory 145 includes all of the hosts of a service. This list of hosts can be on a per company basis.

Other features and functionalities of the graphical user interface 140 are as follows. The GUI 140 permits any person who has the proper credentials to log in to the dynamic configuration system. After appropriate login by a user, the GUI 140 finds the list of services for which the user is listed as an owner. In an embodiment, only a person who is listed as an owner of an online service can alter the configuration properties for that service. After the verified user selects a service from the list, the GUI 140 pulls the configuration properties for that service from the database. At this point, the GUI 140 allows the user to update the configuration properties for the selected service, and the GUI 140 saves the modified configuration properties in the database. The GUI 140 also can display to the user a history of the changes for each configuration property, can revert a configuration property to a prior version of the configuration property, can compare data center values for a configuration property, and can compare host values for a configuration property.

As also noted above, the configuration database 120 has two tables, a configuration property table 121 that stores configuration properties for the online service and a change history table 122 that saves a history of changes for the online service. For the configuration property table 121, each row of the table includes a service name that is a level 1 primary key, a configuration property name that is a level 2 primary key, and a document that contains a timestamp to indicate when the property was last modified, a default value for the configuration property, a property type (e.g., integer, double, string, list of integers), data center specific values, and host specific values. An example of a partial configuration property database table is illustrated in FIG. 4, which shows the service name 410, the property name 420, and the document 430 that includes a default value 431, a type 432, values for a data center 433 and a host 434, and a timestamp 435.

The change history table 122 includes a record for every revision that has occurred to a configuration property. Each record of the history table 122 contains a service name that serves as a level 1 primary key, a configuration property that serves as a level 2 primary key, a monotonically increasing version number that serves as a level 3 primary key, and a document that includes a change type (such as insert, update, delete), a timestamp to record when a change was made, an author to record who made the change, a default value, a data center specific value, and a host specific value. An example of a change history table 122 is illustrated in FIG. 5, which shows the service name 510, the configuration property name 520, the version 530, and the document 540 which contains the change type 541, the timestamp 542, the author 543, the default value 544, the data center specific value 545, and the host specific value 546.

In operation, whenever a user changes a configuration property using the GUI 140, the GUI 140 saves or updates a record in the configuration property table 121, and saves a new record in the change history table 122. The GUI 140 sets the necessary information for the new record in the history table. This information in the change history table 122 includes the change type 541 which can be an insertion (if it is a new property), an update (if it is a change to an existing property), or a deletion (if an existing property was deleted). The information further includes a current time as the timestamp 542, the user's credentials as the author 543, and the new and/or updated values that can include the default value 544, the data center value 545, and the host value 546.

The dynamic configuration client 131 permits an online service to read the dynamic configuration properties without having to know anything about the layers in the dynamic configuration database 120, the properties table 121, or history table 122. The online service further does not need to know anything about the logic of the dynamic configuration, such as the default value, the data center value, the host value, or the host-data center preference. The online service can import and use the client 131 as a library to its code base, and the online service can further use the API 132 that is associated with the client 131. The client 131 reads the system properties to determine where it executes (i.e., data center, host, service). These system properties are set by a systems operations person and/or group when a host is set up in a data center. Using that information, the client 131 can apply precedence rules, that is for example, whether the host value takes precedence over the data center value or vice-versa.

The dynamic configuration client 131 periodically pulls all of the configuration properties for the on line service from the configuration properties database 120. As previously noted, the online service uses its service name as a level 1 primary key to query into the dynamic configuration database 120. The client 131 then applies the associated precedence logic for each configuration property and the client calculates the proper value based on the data center and/or host where the client resides and executes. The interval of time at which the client 131 pulls the configuration properties is configurable. For example, the client can be configured to pull the configuration properties in as little as every minute or even less than every minute. The smaller the value of this configurable interval, the faster that updates will be available to the online service. However, pulling from the configuration database comes with processing cycles and costs for the online service. For most online services, a pulling interval of between 30 and 120 seconds provides appropriate updating. In an alternative embodiment, the online service can be optimized to pull only the properties that were changed since the last retrieval of configuration properties. This can be done by checking the timestamps 435 in the configuration properties 121. The system can be configured such that host values have higher precedence than data center values and data center values have higher precedence than default values.

As noted, the client 131 provides an API 132 that online services can use to read a configuration property with the specific name of the online service, and also to register a call back method or listener process that executes when a configuration property with specific name is changed. An example of an API call is as follows:

getBoolean("EnableDualWrites", false);

In the above, the API process getBoolean queries as to whether EnableDualWrites is defined for the service where the client runs, and returns the corresponding value dictated by the precedence rules. If EnableDualWrites is not defined in the dynamic configuration database for the service where the client runs, a "false" parameter is returned. The following statement registerListener("EnableDualWrites", someFunction);

registers a listener process to be invoked when the EnableDualWrites property changes, which is turn causes someFunction to be called and executed.

Figure 2:
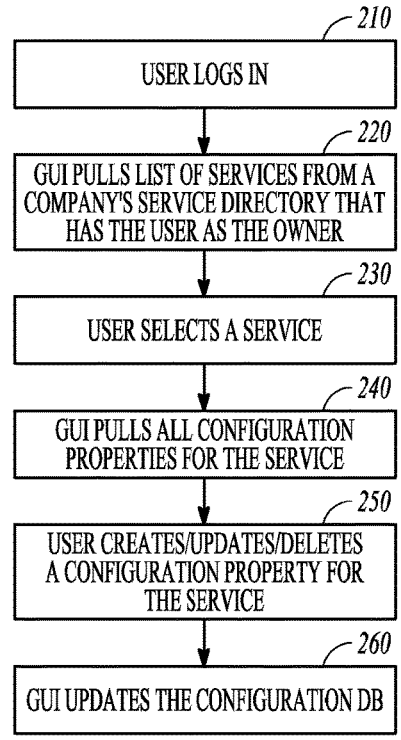
FIG. 2 is a process flowchart of an embodiment to implement a dynamic configuration system.
Figure 3A:
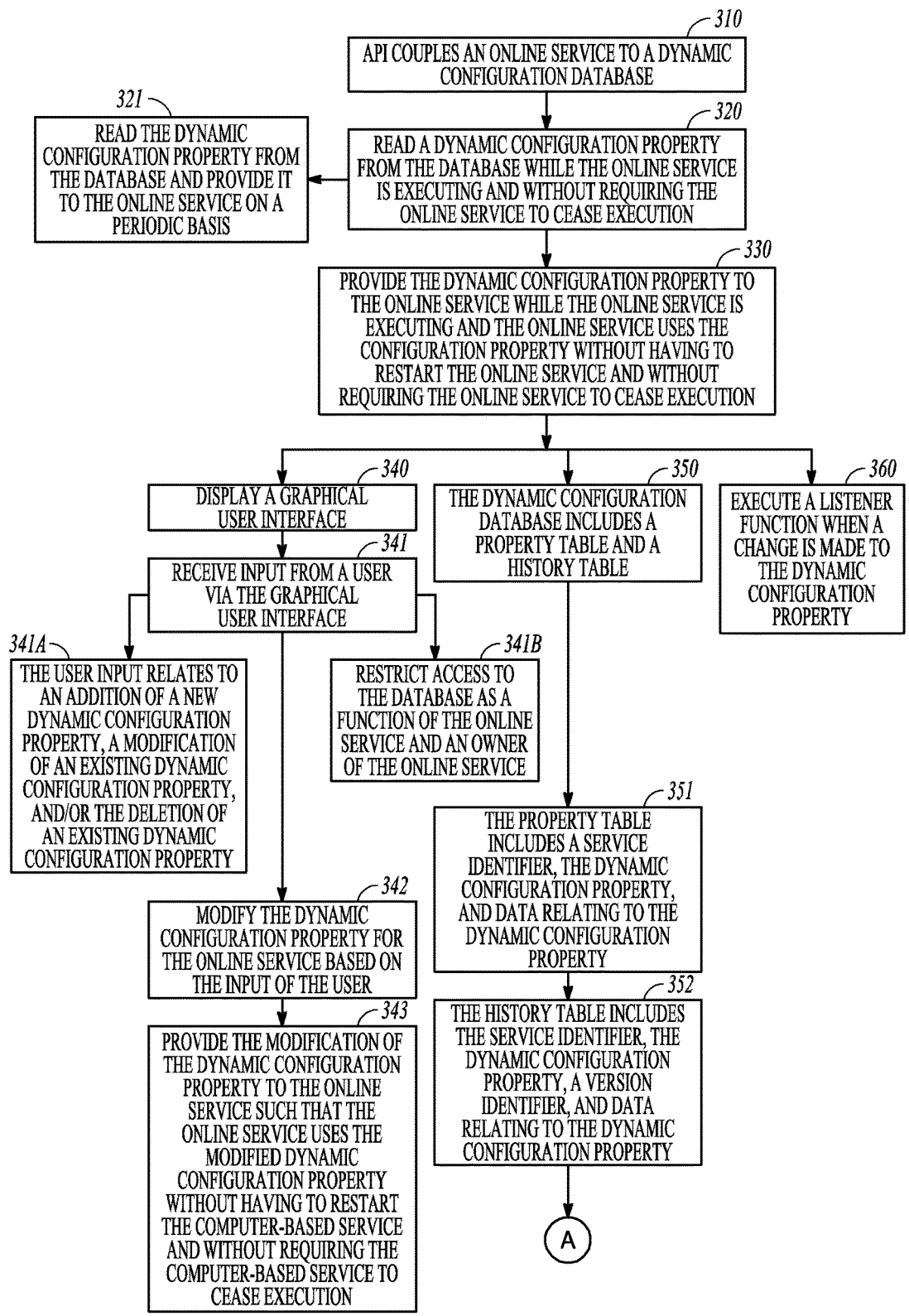
FIGS. 3A and 3B are a process flowchart of another embodiment to implement a dynamic configuration system.
Figure 3B:
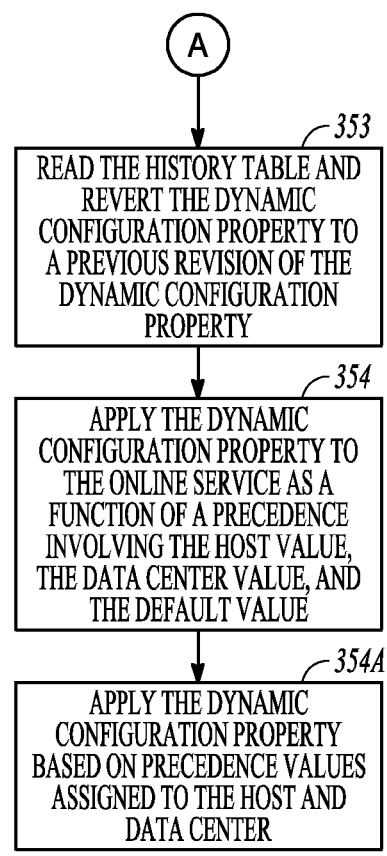

FIGS. 2, 3A, and 3B are process flowcharts of embodiments to implement a dynamic configuration system. FIGS. 2, 3A, and 3B include a number of process blocks 210-260 and 310-361 respectively. Though arranged substantially serially in the examples of FIGS. 2, 3A, and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring specifically to FIG. 2, at 210, a user logs into the dynamic configuration system via a graphical user interface (GUI), and at 220, the GUI pulls a list of services from the company's service directory 145. Additionally, in order for the user to have access to the configuration properties of a service, the system must recognize the user as an owner of the service. At 230, using the GUI, the user selects a service from the list of services that were returned to the user. At 240, the GUI pulls all of the configuration properties that are associated with the selected service. The user reviews the configuration properties via the GUI, and at 250, the user creates, updates, and/or deletes a configuration property for the selected service. Finally, at 260, the GUI updates the configuration database for the selected service. The revised configuration database is then available for the online service to retrieve configuration properties and apply those configuration properties to the online service without having to stop and restart the online service. As noted above, this process can reiterate over a short time interval such that the configuration parameters for an online service are updated in near real time.

FIGS. 3A and 3B illustrate a more detailed embodiment of a dynamic configuration system. For FIGS. 3A and 3B and other embodiments, the dynamic configuration system includes a database having dynamic configuration properties for online services. At 310, the system executes an application program interface (API), which couples the online service to the dynamic configuration database. At 320, the system reads the dynamic configuration property from the database while the online service is executing and without requiring the online service to cease execution. As noted above, this is in contrast to a static configuration system, where in order to apply configuration changes, the online service must be stopped and restarted. Block 321 indicates that the system can read the dynamic configuration property from the database and provide the dynamic configuration property to the online service on a periodic basis. For example, the system can read the database every minute. At 330, the system provides the dynamic configuration property to the online service while the online service is executing. Since the online service continues to execute, the online service can use the configuration property without having to restart the online service and without requiring the online service to cease execution. Consequently, the dynamic configuration system improves the operability and flexibility of an online service, thereby improving the functionality of the online service and the computer system on which the online service executes.

In addition to simply providing configuration properties to an online service on a real time basis and without requiring the online service to cease execution, the dynamic configuration system also permits a user to modify the configuration properties for an online service. For example, as illustrated at 340, the system displays a graphical user interface on a computer display device, and at 341, the system receives input from a user via the graphical user interface. As indicated at 341A, the user input relates to an addition of a new dynamic configuration property, a modification of an existing dynamic configuration property, and/or the deletion of an existing dynamic configuration property. As indicated at 341B, the dynamic configuration system can restrict access to the database as a function of the identity of the online service and an owner of the online service. For example, a company can only access the configuration properties of its own online services, and only persons within the company who are designated as owners can modify the configuration properties. At 342, the dynamic configuration system modifies the dynamic configuration property for the online service in the database based on the input of the user. Then, at 343, the dynamic configuration system provides the modification of the dynamic configuration property to the online service and the online service uses the modified dynamic configuration property without having to restart the computer-based service and without requiring the computer-based service to cease execution.

Block 350 illustrates that the dynamic configuration database includes a property table and a history table. Block 351 illustrates that the property table includes a service identifier for the online service, the configuration property for the identified service, and data relating to the configuration property. The service identifier serves as a primary key into the dynamic configuration database, and the dynamic configuration property serves as a secondary key into the dynamic configuration database. The data relating to the dynamic configuration property includes a timestamp, a default value, a property type, a data center value, and a host value. The timestamp indicates the date and time that a change was made to a particular configuration property. The default value is the default value for the particular configuration property. The property type is the data type of the value for the particular configuration property. The data center values are values for the configuration property for particular data centers, and the host values are values for the configuration property for particular hosts. Block 352 illustrates that the history table includes the service identifier of the online service (which serves as the primary key for the history table), the dynamic configuration property for the online service (which serves as the secondary key for the history table), a version identifier (which serves as the tertiary key for the history table), and data relating to the dynamic configuration property. The version identifier, as the name suggests, identifies the version of the service, so that when any property of a service is modified, the version of the service is incremented by one. So if the service has been modified three times, the version will be the fourth version (an original version plus the three modifications). The data relating to the dynamic configuration property includes a change type, a timestamp, an author, the default value, and a collection of data center values and host values. The change type indicates whether the modification was a change to an existing property, an addition of a new property, or the deletion of an existing property. The timestamp indicates the date and time that a change was made to a particular configuration property. The author indicates the person who made the modification to a particular configuration property. The default value indicates the default value for this particular configuration property, and the data center value and host value indicate configuration property values for a particular data center and host.

Block 353 indicates that the dynamic configuration system can read the history table, and can revert the dynamic configuration property to a previous version of the dynamic configuration property. For example, a user can revert from a current version number 5 of 300 maximum queries per second for an online service to a previous version number 3 of 200 maximum queries per second for an online service. The change to version 5 may have been to accommodate an anticipated busy time for the online service, and the user may want to revert back to a more normal property of 200 maximum queries per second for the online service. At 354, the dynamic configuration system applies the dynamic configuration property to the online service as a function of a precedence involving the host value, the data center value, and the default value. For example, the dynamic configuration system may be programmed to first use the configuration property value as stored for the particular host. If there is no configuration property value for the particular host, then the system looks to use the configuration value for the particular data center. If there is no configuration value for the particular data center, then the system uses the default value. In an alternative embodiment, as indicated at 354A, the dynamic configuration system applies the configuration property value based on precedence values assigned to the host and data center.

At 360, the dynamic configuration system executes a particular process or function, such as a listener function, when a change is made to the dynamic configuration property in the database.

In summary, an embodiment of a dynamic configuration system makes changes to online services available in near real time without requiring a stop and restart of the online service. This of course greatly improves the functionality of the computerized online service. The dynamic configuration system further permits configuration property values to have any basic data type. The dynamic configuration system also permits a configuration property to have different values for a data center and a host. A change history table tracks all changes to all configuration properties. The change history table can be used for change audits to determine who changed what and when the changes was made. This of course is very helpful to company audit procedures. The dynamic configuration system provides an API to the online services so that the online services can read the configuration properties.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The invention claimed is:

1. A system comprising:
    a database comprising a dynamic configuration property for a computer-based service; and
    a non-transitory computer readable medium coupled to the database, the computer readable medium having instructions stored thereon, which, when executed by a processor cause the system to:
        execute an application program interface that couples the computer-based service to the database;
        read the dynamic configuration property from the database while the computer-based service is executing and without requiring the computer-based service to cease execution; and
        provide the dynamic configuration property to the computer-based service while the computer-based service is executing such that the computer-based service can use the dynamic configuration property without having to restart the computer-based service and without requiring the computer-based service to cease execution;
    wherein the database comprises:
    a property table; and
    a history table;
    wherein the property table comprises:
        a service identifier of the computer-based service as a primary key;
        the dynamic configuration property as a secondary key: and
        data relating to the dynamic configuration property comprising a timestamp, a default value, a property type, a data center value, and a host value; and
    wherein the history table comprises:
        the service identifier of the computer-based service as the primary key;
        the dynamic configuration property as the secondary key; a version identifier as a tertiary key: and data relating to the dynamic configuration property comprising a change type, a timestamp, an author, the default value, the data center value, and the host value;
    wherein the computer readable medium having instructions to apply the dynamic configuration property to the computer-based service as a function of a precedence involving the host value, the data center value, and the default value.

2. The system of claim 1, the computer readable medium having instructions to:
    display a graphical user interface on a computer display device;
    receive input from a user via the graphical user interface; and
    modify the dynamic configuration property in the database as a function of the user input;
    wherein the modification of the dynamic configuration property is provided to the computer-based service and the computer-based service uses the modified dynamic configuration property without requiring the computer-based service to cease execution and without having to restart the computer-based service.

3. The system of claim 2, wherein the input comprises one or more of an addition of a new dynamic configuration property a modification of an existing dynamic configuration property, and the deletion of the existing dynamic configuration property.

4. The system of claim 2, the computer readable medium having instructions to restrict access to the database as a function of the computer-based service and an owner of the computer-based service.

5. The system of claim 1, the computer readable medium having instructions to read the history table and revert the dynamic configuration property to a previous version of the dynamic configuration property.

6. The system of claim 1, the computer readable medium having instructions to apply a dynamic configuration property having a high precedence to the computer-based service.

7. The system of claim 1, the computer readable medium having instructions to read the dynamic configuration property from the database and provide the dynamic configuration property to the computer-based service on a periodic basis, the periodic basis occurring approximately once a minute.

8. The system of claim 1, the computer readable medium having instructions to execute a listener function when a change is made to the dynamic configuration property in the database.

9. The system of claim 8, the computer readable medium having instructions to execute a particular process or function when the change is made to the dynamic configuration property in the database.

10. The system of claim 1, the computer readable medium having instructions to compare a dynamic configuration property associated with the data center value and a dynamic configuration property associated with the host value, and to determine to use the dynamic configuration property associated with the data center value, the dynamic configuration property associated with the host value, or a default dynamic configuration property based on the comparison.

11. A method comprising:
executing an application program interface that couples a computer-based service to a database comprising a dynamic configuration property;
reading the dynamic configuration property from the database while the computer-based service is executing and without requiring the computer-based service to cease execution; and providing the dynamic configuration property to the computer-based service while the computer-based service is executing such that the computer-based service can use the dynamic configuration property without requiring the computer-based service to cease execution and without having to restart the computer-based service;
wherein the database comprises:
a property table: and
a history table:
wherein the property table comprises:
a service identifier of the computer-based service as a primary key; the dynamic configuration property as a secondary key; and data relating to the dynamic configuration property comprising a timestamp, a default value, a property type, a data center value, and a host value; and wherein the history table comprises:
the service identifier of the computer-based service as the primary key:
the dynamic configuration property as the secondary key: a version identifier as a tertiary key; and
data relating to the dynamic configuration property comprising a change type, a timestamp, an author, the default value, the data center value, and the host value;
applying the dynamic configuration property to the computer-based service as a function of a precedence involving the host value, the data center value, and the default value.

12. The method of claim 11, comprising:
displaying a graphical user interface on a computer display device;
receiving input from a user via the graphical user interface; and
modifying the dynamic configuration property in the database as a function of the user input;
wherein the modification of the dynamic configuration property is provided to the computer-based service and the computer-based service uses the modified dynamic configuration property without requiring the computer-based service to cease execution and without having to restart the computer-based service.

13. The method of claim 11, comprising reading the dynamic configuration property from the database and providing the dynamic configuration property to the computer-based service on a periodic basis, the periodic basis occurring approximately once a minute.

14. The method of claim 11, comprising executing a listener function when a change is made to the dynamic configuration property in the database.

15. The method of claim 14, comprising executing a particular process or function when the change is made to the dynamic configuration property in the database.

16. A non-transitory computer readable medium comprising instructions thereon that when executed by a processor execute a process comprising:
executing an application program interface that couples a computer-based service to a database comprising a dynamic configuration property;
reading the dynamic configuration property from the database while the computer-based service is executing and without requiring the computer-based service to cease execution; and
providing the dynamic configuration property to the computer-based service while the computer-based service is executing such that the computer-based service can use the configuration property without requiring the computer-based service to cease execution and without having to restart the computer-based service;
wherein the database comprises:
a property table; and
a history table;
wherein the property table comprises:
a service identifier of the computer-based service as a primary key;
the dynamic configuration property as a secondary key; and
data relating to the dynamic configuration property comprising a timestamp, a default value, a property type, a data center value, and a host value; and
wherein the history table comprises:
the service identifier of the computer-based service as the primary key;
the dynamic configuration property as the secondary key;
a version identifier as a tertiary key; and data relating to the dynamic configuration property comprising a change type, a timestamp, an author, the default value, the data center value, and the host value;

wherein the computer readable medium having instructions to apply the dynamic configuration property to the computer-based service as a function of a precedence involving the host value, the data center value, and the default value.

17. The computer readable medium of claim 16, comprising instructions for executing a process comprising:

displaying a graphical user interface on a computer display device;

receiving input from a user via the graphical user interface; and modifying the dynamic configuration property in the database as a function of the user input, wherein the modification of the dynamic configuration property is provided to the computer-based service and the computer-based service uses the modified dynamic configuration property without requiring the computer-based service to cease execution and without having to restart the computer-based service.

* * * * *

UNITED STATES PATENT AND TRADEMARK OFFICE
CERTIFICATE OF CORRECTION

| | | |
|---|---|---|
| PATENT NO. | : 9,880,864 B2 | Page 1 of 1 |
| APPLICATION NO. | : 14/943805 | |
| DATED | : January 30, 2018 | |
| INVENTOR(S) | : Koufogiannakis et al. | |

It is certified that error appears in the above-identified patent and that said Letters Patent is hereby corrected as shown below:

In the Claims

In Column 11, Line 1, in Claim 3, delete "property" and insert --property,-- therefor In Column 11, Line 54, in Claim 11, delete "table:" and insert --table;-- therefor In Column 11, Line 55, in Claim 11, delete "table:" and insert --table;-- therefor In Column 11, Line 59, in Claim 11, after "and", insert --¶--

In Column 11, Line 62, in Claim 11, after "and", insert --¶--

In Column 11, Line 65, in Claim 11, delete "key:" and insert --key;-- therefor

In Column 11, Line 67, in Claim 11, delete "key:" and insert --key;¶-- therefor

In Column 13, Line 17, in Claim 17, delete "input," and insert --input;-- therefor Signed and Sealed this
Fourth Day of June, 2019

Andrei Iancu
*Director of the United States Patent and Trademark Office*